(12) United States Patent
Seeley et al.

(10) Patent No.: US 8,881,527 B2
(45) Date of Patent: Nov. 11, 2014

(54) SYSTEMS AND METHODS FOR GENERATING ELECTRICITY

(75) Inventors: Charles Erklin Seeley, Niskayuna, NY (US); Dmytro Floriyovych Opaits, Glenville, NY (US); Sunilkumar Onkarnath Soni, Albany, NY (US); Chiranjeev Kalra, Glenville, NY (US)

(73) Assignee: General Electric Company, Niskayuna, NY (US)

( * ) Notice: Subject to any disclaimer, the term of this patent is extended or adjusted under 35 U.S.C. 154(b) by 224 days.

(21) Appl. No.: 13/459,325

(22) Filed: Apr. 30, 2012

(65) Prior Publication Data

US 2013/0285379 A1 Oct. 31, 2013

(51) Int. Cl.
*F01K 17/00* (2006.01)
*F01B 21/04* (2006.01)

(52) U.S. Cl.
USPC .................................. 60/686; 60/670; 60/698

(58) Field of Classification Search
USPC ...................................... 60/685–686, 670, 698
See application file for complete search history.

(56) References Cited

U.S. PATENT DOCUMENTS

| | | | | |
|---|---|---|---|---|
| 4,328,436 | A * | 5/1982 | Biblarz et al. | 310/11 |
| 5,735,125 | A * | 4/1998 | Tarelin et al. | 60/685 |
| 5,992,152 | A | 11/1999 | Weres et al. | |
| 6,168,689 | B1 | 1/2001 | Park et al. | |
| 6,672,825 | B1 * | 1/2004 | Tarelin et al. | 415/1 |
| 6,698,205 | B2 * | 3/2004 | Tarelin et al. | 60/686 |
| 2009/0165456 | A1 * | 7/2009 | Masada | 60/531 |
| 2009/0320477 | A1 * | 12/2009 | Juchymenko | 60/651 |
| 2010/0101934 | A1 | 4/2010 | Saykally et al. | |
| 2010/0183424 | A1 | 7/2010 | Roy | |

FOREIGN PATENT DOCUMENTS

| | | |
|---|---|---|
| GB | 1097858 A | 3/1968 |
| WO | 2005018082 A1 | 2/2005 |
| WO | 2008136698 A1 | 11/2008 |

OTHER PUBLICATIONS

Chen et al., "Experimental Research on Electrostaticfield Enhancement of Condensation Heat Transfer", Annual Report—Conference on Electrical Insulation and Dielectric Phenomena, pp. 482-484, Oct. 14-17, 2007.
Chen et al., "Study of EHD Effect on Enhanced Condensation Heat Transfer of Dielectric Fluid", Conference Record of the 2004 IEEE International Symposium on Electrical Insulation, pp. 249-252, Sep. 19-22, 2004.

* cited by examiner

*Primary Examiner* — Hoang Nguyen
(74) *Attorney, Agent, or Firm* — Seema S. Katragadda

(57) ABSTRACT

Power plant systems and methods are presented. The power plant includes a steam turbine configured to release exhaust steam. The power plant further includes an electro-hydrodynamic system operatively coupled to the steam turbine. The electro-hydrodynamic system is configured to receive the exhaust steam from the steam turbine and generate auxiliary electric power using the exhaust steam.

19 Claims, 3 Drawing Sheets

SYSTEMS AND METHODS FOR GENERATING ELECTRICITY

BACKGROUND

Embodiments of the present disclosure relate to power plants, and more particularly to combined power plants.

Conventionally, a power plant converts latent energy of a substance into electric power. For example, a steam turbine power plant converts the latent energy of high-pressure steam into electric power. To this end, the steam turbine power plant includes multiple stages of interspersed stationary nozzles and rotating blades. When steam is introduced into the turbine, the stationary nozzles direct the steam towards the rotating blades. The force with which the steam impinges on the rotating blades forces the blades to rotate at a speed corresponding to the potential and kinetic energy of the steam. The mechanical energy of the rotating blades is converted into electric power using an electric generator.

In typical steam turbines, exhaust steam is generally released into the environment. In the last few decades, however, to control the increasing expenses of operating a steam turbine power plant, engineers have attempted to increase the efficiency of the power plant. One such power plant is a reheat power plant. In this power plant, the steam released by the steam turbine is condensed and reheated for further utilization by the steam turbine. Subsequently, combined-cycle power plants were devised to further increase power plant efficiency. In these power plants, two or more power plants are combined such that the combined efficiency of the power plants is greater than the efficiency of the individual power plants. For example, in a gas-steam combined-cycle power plant, hot gases expelled by a gas turbine are utilized to generate steam for the steam turbine, thereby increasing the overall efficiency of the power plant. Along a similar principle, power plants in which the exhaust steam from a high-pressure steam turbine is further utilized by a low-pressure steam turbine were developed. Recently, supercritical steam turbines and ultra-supercritical steam turbines have been developed that can handle steam having very high temperature and/or pressure, thereby enhancing plant efficiency.

Although these modifications to the power plants increase efficiency, some of these modifications may require design changes in the existing steam turbine plants. Such modifications can be very expensive to implement. Moreover, other alterations to the power plants may only marginally increase their efficiency.

BRIEF DESCRIPTION OF THE INVENTION

In accordance with aspects of the present disclosure, a power plant is presented. The power plant includes a steam turbine configured to release exhaust steam. Further, the power plant includes an electro-hydrodynamic (EHD) system operatively coupled to the steam turbine. The EHD system may be configured to receive at least a portion of the exhaust steam from the steam turbine and generate auxiliary electric power using the exhaust steam.

In accordance with another aspect of the present disclosure, a power plant is presented. The power plant includes a steam turbine configured to release exhaust steam from an outlet. The power plant may further include an EHD system operatively coupled to the outlet of the steam turbine and configured to generate auxiliary electric power using at least a portion of the exhaust steam from the steam turbine. The EHD system may include a charging system configured to deposit an electrostatic charge on a plurality of droplets in the exhaust steam, and a charge collector configured to collect the electrostatic charge from the plurality of droplets.

In accordance with yet another aspect of the present disclosure, a method for generating electric power in a power plant is presented. The method includes receiving at least a portion of exhaust steam from a steam turbine. Also, the method includes electrostatically charging a plurality of droplets in the exhaust steam using a charging system. Furthermore, the method includes accumulating an electrostatic charge from the plurality of electrostatically charged droplets using a charge collector. In addition, the method includes generating auxiliary electric power from the accumulated electrostatic charge.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Embodiments of the present disclosure are related to an exemplary power plant for generating electric power. The power plant described hereinafter includes a steam turbine and an electro-hydrodynamic (EHD) system operatively coupled in series. The EHD system employs at least a portion of exhaust steam expended by the steam turbine to generate auxiliary electric power, thereby utilizing the exhaust steam more effectively than conventional power plants.

It will be understood that throughout this disclosure, the term 'steam' is used to refer to the steam generated by an evaporator before being conveyed to the steam turbine. Further, the term 'exhaust steam' is used to refer to the steam released by the steam turbine. It will be appreciated that the temperature and pressure of the exhaust steam may be lower than the temperature and pressure of the steam entering the steam turbine as at least a portion of the energy in the steam may be expended in the steam turbine. Moreover, the term 'EHD spent steam' is used to refer to the steam released by the EHD system.

Figure 1:
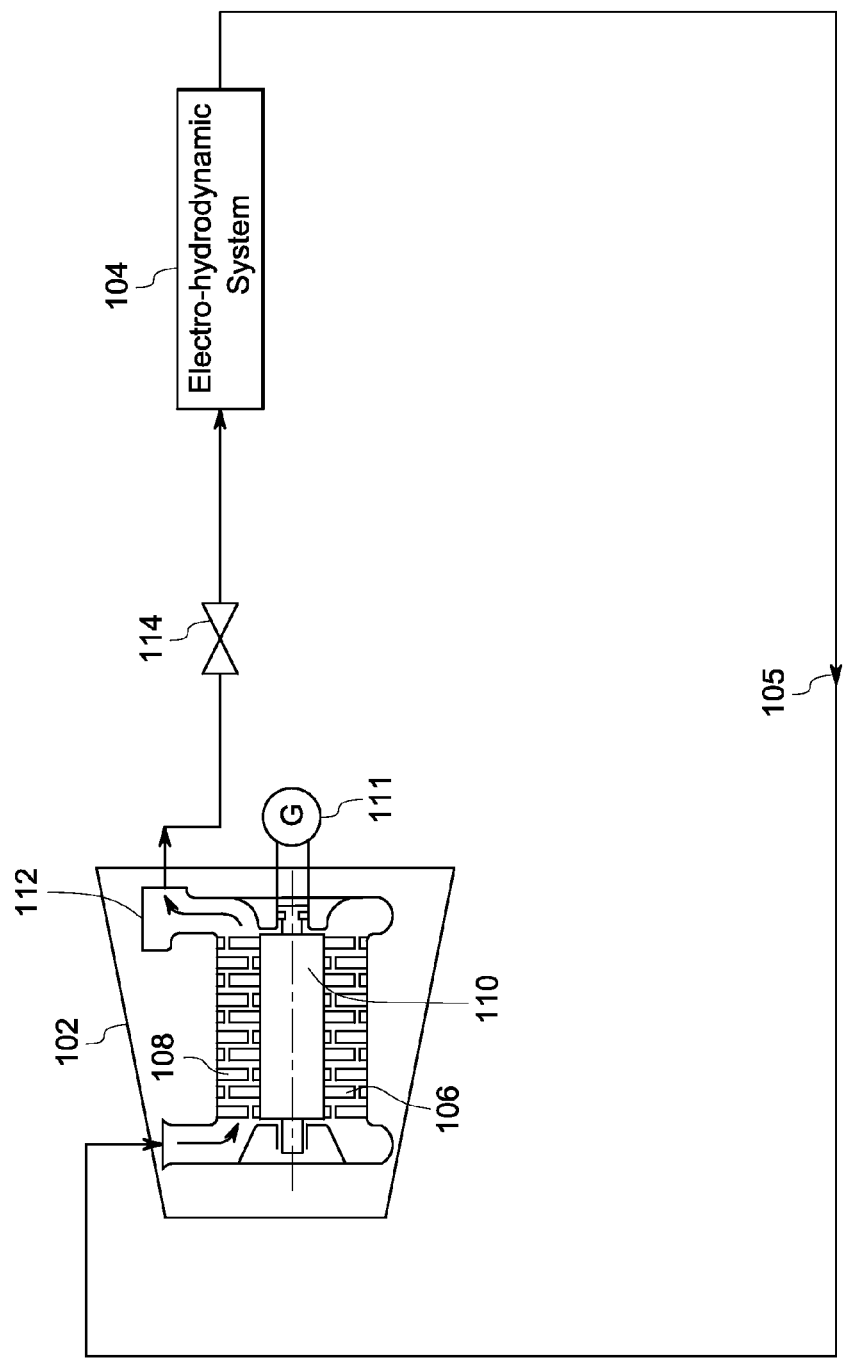
FIG. 1 is a block diagram of an exemplary power plant, according to aspects of the present disclosure.

FIG. 1 illustrates an exemplary power plant 100, in accordance with one aspect of the present disclosure. The power plant 100 includes a steam turbine 102 and an EHD system 104 that is operatively coupled to the steam turbine 102. A direction of steam flow in the power plant 100 is generally represented by reference numeral 105. For instance, in the example of FIG. 1, steam flows in a loop from the steam turbine 102 to the EHD system 104 and then back to the steam turbine 102. In other embodiments, the steam may not flow back to the steam turbine 102. Instead, it may be expelled from the power plant 100 at an output of the EHD system 104.

Moreover, in the example of FIG. 1, one steam turbine 102 and one EHD system 104 are depicted to simplify the diagrammatical representation of the power plant 100. In an actual implementation, however, the number of steam turbines and EHD systems may easily be greater than one without departing from the scope of the present disclosure. For example, the power plant 100 may include a series of steam turbines coupled to one or more EHD systems. Furthermore, although FIG. 1 illustrates only the steam turbine 102 and the EHD system 104, for brevity, in an actual implementation, the power plant 100 may include one or more additional systems such as a gas turbine providing an input to the steam turbine 102 or utilizing the output of the EHD system 104.

The steam turbine 102 typically includes multiple stages of interspersed stationary nozzles 106 and rotating blades 108 mounted on a shaft 110. The shaft 110 of the steam turbine 102, in turn, may be operatively coupled to an electric generator 111. Further, the stationary nozzles 106 may be angled to direct and guide steam onto a face of the rotating blades 108 and may include multiple small openings (not shown) to increase the velocity of the steam. During operation, an evaporator or boiler (not shown) may supply steam to the steam turbine 102. In the steam turbine 102, the steam velocity may be increased by directing the steam through the small openings in the nozzles 106. This high velocity steam is impinged on the face of the rotating blades 108, causing the blades 108 to rotate at a speed substantially proportional to the velocity of the impinging steam. Rotation of the blades 108 in turn causes the shaft 110 to rotate. This rotation of the shaft 110 is conveyed to the generator 111, which converts the mechanical energy of the rotating shaft 110 into electric power. The electric power generated by the electric generator 111 is referred to as "primary power" is this disclosure.

Exhaust steam may be released from the steam turbine 102 through an outlet 112. It will be appreciated that the outlet 112 may be a small opening in the steam turbine 102, a pipe, or a tube projecting out from the steam turbine 102, or a vent. Typically, the temperature and/or pressure of the exhaust steam is lower than the temperature and/or pressure of the steam entering the steam turbine 102. This variation in temperature and/or pressure may be because a portion of the energy of the steam is expended in rotating the blades 108.

It will be understood that the steam turbine 102 may be a high-pressure steam turbine, an intermediate pressure steam turbine, or a low-pressure steam turbine. Further, the steam turbine 102 may be a combination of the high-pressure, intermediate-pressure, and/or low-pressure steam turbines. For example, the steam turbine 102 may include a cascade of a high-pressure steam turbine, an intermediate-pressure steam turbine, and a low-pressure steam turbine. Alternatively, the steam turbine 102 may be a combination of high-pressure and low-pressure turbines. Moreover, the steam turbine 102 may be a condensing turbine, a non-condensing turbine, a reheat turbine, an extraction turbine, or an induction turbine. It will be understood that various other types of steam turbines, such as supercritical steam turbines, may be utilized without departing from the scope of the present disclosure. In some embodiments, the steam turbine 102 may be a double exhaust turbine in which steam is introduced through the center of the steam turbine and exhaust steam is released through outlets present at both ends of the steam turbine.

To operate, the steam turbine 102 may utilize dry steam or wet steam. Typically, high-pressure steam turbines utilize dry steam, while low-pressure steam turbines utilize wet steam. As used herein, the term 'dry steam' refers to steam that is heated at a temperature higher than the boiling point of water such that the steam includes very few or no water droplets. Dry steam increases the efficiency of the steam turbine 102 and lowers chances of turbine corrosion. The term saturated or wet steam, on the other hand, is used to refer to steam that is heated at a temperature approximately equal to the boiling point of water and therefore this type of steam may include multiple water droplets. It may be noted that irrespective of the steam turbine 102 utilizing wet or dry steam, tiny droplets are formed in the exhaust steam by the time the steam passes through the various nozzle-blade stages. The droplets may be formed because the temperature and/or pressure of the steam may be greatly reduced by the time the steam is released from the steam turbine 102. Further, the droplets may also be formed because a portion of the steam may be condensed while interacting with various nozzles and blade surfaces of the steam turbine 102. Consequently, the exhaust steam typically released from the outlet 112 of both high-pressure and low-pressure steam turbines includes multiple water droplets. However, the number of droplets present in the exhaust steam of a high-pressure steam turbine may be substantially lower than the number of droplets present in the exhaust steam of a low-pressure steam turbine.

In one embodiment, the EHD system 104 may be coupled to the outlet 112 of the steam turbine 102. As previously noted, based on the desired application, the steam turbine 102 may include a low-pressure steam turbine or a high-pressure steam turbine. In case of double exhaust turbines, two EHD systems may be coupled to the outlets (one at each end of the steam turbine 102). In another embodiment, the EHD system 104 may be coupled between one or more stages of the steam turbine 102. For example, the EHD system 104 may be coupled between the last and penultimate stages of the steam turbine 102. Alternatively, the EHD system 104 may be coupled between a high-pressure steam turbine and an intermediate-pressure steam turbine. The placement of the EHD system 104 dictates the overall efficiency of the power plant 100. In some cases, depending on the desired efficiency, the placement of the EHD system 104 with respect to the steam turbine 102 may be alterable or adjustable without departing from the scope of the present disclosure.

Typically, EHD systems include a droplet generator, a charging system, and a charge collector. The droplet generator generates micron-sized water droplets, while the charging system places a small electrostatic charge on the water droplets and the charge collector collects this charge. A drag force is typically required to draw the charged droplets towards the charge collector and away from an electrostatic field created by the charging system. Conventionally, these EHD systems are utilized in wind turbines, where the wind provides the drag force for drawing the charged droplets away from the charging system and towards the charge collector. In these EHD systems, the wind speed determines the number of droplets carried away from the charging system per unit time, and therefore the amount of electrical energy generated by the device.

Embodiments of the EHD system 104, in accordance with aspects of the present disclosure, however, do not include a droplet generator or a wind source. By way of example, in the presently contemplated configuration of FIG. 1, the EHD system 104 is configured to receive at least a portion of the exhaust steam from the steam turbine 102. Furthermore, the exhaust steam that is output from the steam turbine 102 includes droplets. Hence, the need for a droplet generator is circumvented. Further, in one example, the power plant 100 may include one or more pressure differential valves 114 disposed between the steam turbine 102 and the EHD system 104. The pressure differential valves 114 may be configured to reduce the cross-section of a pipe through which the exhaust steam may travel towards the EHD system 104. Such a reduction in the cross-section may increase the velocity of the exhaust steam entering the EHD system 104. Consequently, the need for a wind source to drag the droplets to the charge collector may be circumvented. Instead, the EHD system 104 utilizes the droplets present in the exhaust steam as charge carriers and the velocity of the exhaust steam as a medium for carrying the charge carriers to the charge collector. Operation of the exemplary EHD system 104 will be described in detail with reference to FIG. 2.

Figure 2:
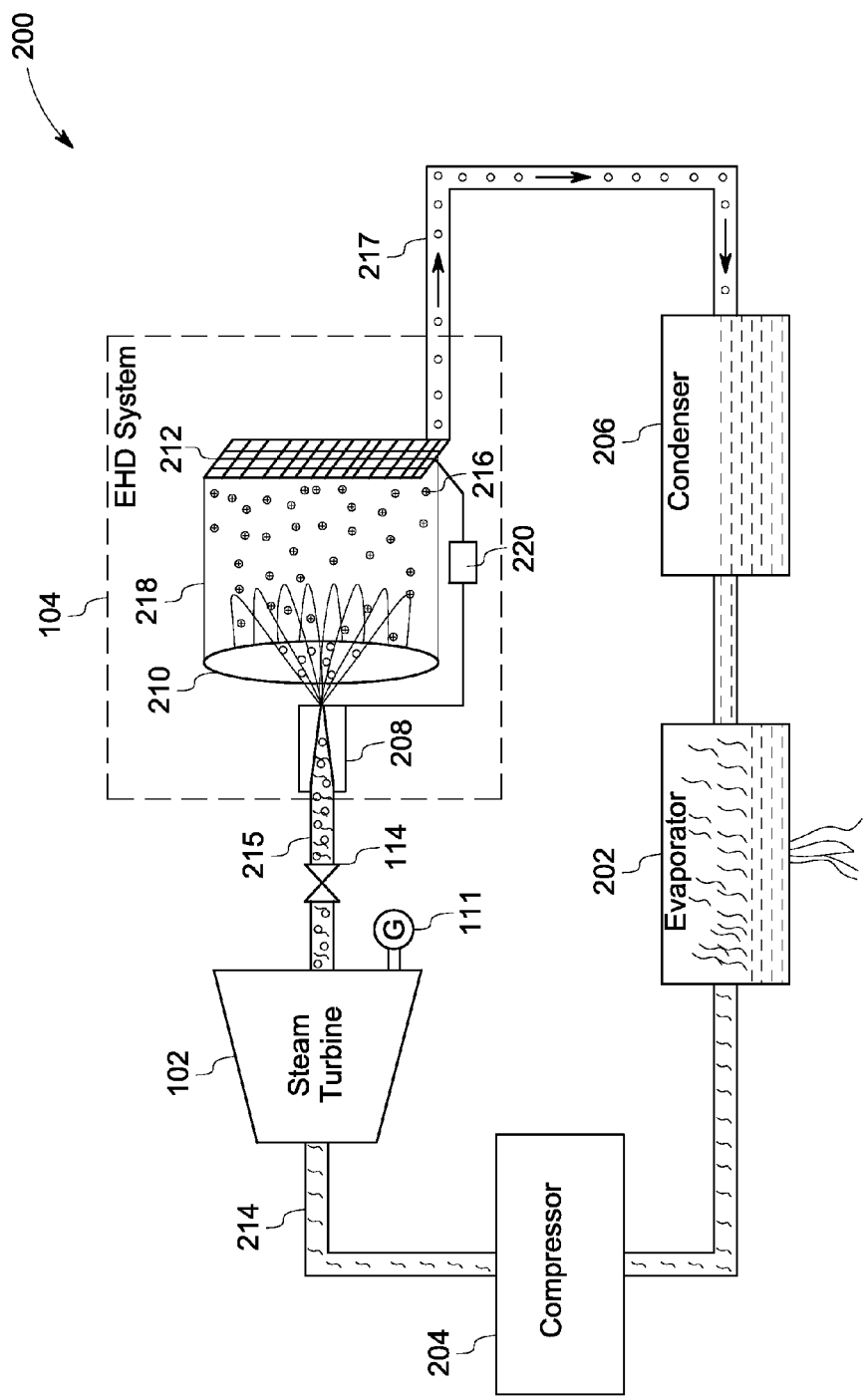
FIG. 2 is a diagrammatical representation of the power plant of FIG. 1 in detail, according to aspects of the present disclosure.

FIG. 2 is a detailed diagrammatical representation of the power plant 100 of FIG. 1. In particular, FIG. 2 depicts components of the EHD system 104 and various other modules of the power plant 100. The power plant 100 may include an evaporator 202 for converting water into steam. In addition, the power plant 100 may include a compressor 204 operatively coupled between the evaporator 202 and the steam turbine 102 for increasing the temperature and/or pressure of the steam. The power plant 100 may further include a condenser 206 operatively coupled between the EHD system 104 and the evaporator 202 for receiving spent steam from the EHD system 104 and condensing the spent steam into a liquid. Although the embodiment of FIG. 2 depicts the condenser 206 as being operatively coupled to the EHD system 104, in certain embodiments, the condenser 206 may be an integral part of the EHD system 104. Moreover, the EHD system 104 may include an inlet 208, a charging system 210, and a charge collector 212. Further, reference numeral 214 is representative of the steam, while reference numeral 215 is representative of the exhaust steam. Furthermore, reference numeral 217 is representative of the spent steam and reference numeral 216 is representative of the charged droplets.

The evaporator 202 may be configured to heat water to produce the steam 214. To this end, the evaporator 202 may receive water from the condenser 206. In certain embodiments, the evaporator 202 may also be configured to receive water from a water reservoir (not shown). As previously described, when the steam 214 passes through the rotating blades 108 of the steam turbine 102, often, a part of the steam 214 may condense and form droplets. These droplets may cling onto the rotating blades 108 (see FIG. 1), be drawn into the blades 108, or be consumed in any other known fashion in the steam turbine 102 or the EHD system 104. To compensate for the lost steam and/or the droplets, water may be pumped into the evaporator 202 from the water reservoir, from time to time. Further, to produce the steam 214, the evaporator 202 may utilize various sources. For example, the evaporator 202 may utilize fossil fuels, nuclear power, solar power, or electric power to generate the steam 214. In case the power plant 200 includes another energy source such as a gas turbine, residual hot gases exhausted by the gas turbine may be utilized to heat the water and convert the water into steam.

Typically, the steam 214 generated by the evaporator 202 is wet steam. In some embodiments, a superheater (not shown) may be coupled to an output of the evaporator 202 to convert the wet steam into dry steam. Superheating reduces the water content of the steam 214 such that all the water from the steam 214 is evaporated and the steam 214 is essentially dry. To this end, the superheater is configured to heat the steam 214 above the boiling point of water for extended periods of time. Exemplary superheaters include radiant heaters, convection heaters, and separately fired heaters. In case a radiant superheater is used, the superheater may be placed directly in a chamber of the evaporator 202. Alternatively, if a convection superheater is utilized, the superheater may be located in the path of the steam 214 released by the evaporator 202. In case a separately fired superheater is utilized, the superheater may be remote from the evaporator 202. A superheater is generally utilized in high-pressure steam turbine power plants as these turbines typically utilize dry steam.

The wet or dry steam from the evaporator 202 or the superheater, respectively, may be conveyed to the compressor 204.

The compressor 204 may be configured to increase the pressure and, in turn, the temperature of the steam 214 to a determined value. The high pressure and temperature steam may be directed to the steam turbine 102. In high-pressure steam turbines, the high-pressure steam increases the efficiency of the steam turbine as the high-pressure steam has higher potential and kinetic energy than low-pressure steam. Moreover, steam at high pressure can perform more mechanical work than steam at lower pressure.

Additionally, in one embodiment, the condenser 206 may be coupled between the EHD system 104 and the evaporator 202 to convert the spent steam 217 from the EHD system 104 back into water. As noted previously, in certain embodiments, the condenser 206 may be an integral part of the EHD system 104. In such a case, an output of the charge collector 212 may be coupled to an input of the condenser 206. Further, the condenser 206 may be configured to convert the steam from the charge collector 212 into a liquid. The liquid may be output from the EHD system 104 and conveyed to the evaporator 202, for example.

Various condenser types may be utilized either independently or as an integral part of the EHD system 104 without departing from the scope of the present disclosure. For example, a surface condenser may be utilized. Surface condensers typically include a shell and a circuitous tube within the shell. Cooling water or a coolant may be circulated through the tube and the spent steam 217 may be released into the shell. Condensation occurs in the shell as the steam in the shell interacts with the cold tube. The condensate/water may drip down and collect at the bottom, often in a built-in pan called a hotwell. The condensed water may be supplied to the evaporator 202 where the condensed water is converted into steam 214 again.

As noted previously, the EHD system 104 may include the inlet 208 that is operatively coupled to the outlet 112 of the steam turbine 102. The coupling may be temporary or permanent. Examples of temporary coupling include screw-thread assemblies, snap-fit assemblies, luer-locks, and the like. Examples of permanent coupling may include welding, forming, or molding. In some embodiments, the outlet 112 may be an insulated tube that maintains the temperature and/or pressure of the exhaust steam 215. The inlet 208 may have dimensions that are substantially similar to the dimensions of the outlet pipe/vent of the steam turbine 102. Alternatively, the dimensions of the inlet 208 and the outlet 112 may be dissimilar. In such a case, an intermediate tube or sealant may be introduced between the inlet 208 and the outlet 112 to mechanically couple the outlet 112 to the inlet 208.

In another embodiment, a distal end of the inlet 208 may have a cross-section that is substantially similar to the cross-section of the outlet pipe/vent, while a proximal end of the inlet 208 may have relatively smaller dimensions. As used herein, the term 'distal end' is used to refer to an end of the inlet 208 that is coupled to the outlet 112 and the term 'proximal end' is used to refer to the other end of the inlet 208. The smaller cross-section of the inlet 208 at the proximal end may aid in increasing the velocity of the exhaust steam 215 entering the EHD system 104. Further, the proximal end of the inlet 208 may include one or more nozzles having cross-sections in the order of a few micrometers to a few millimeters. Such small-dimensioned nozzles may aid in breaking up big droplets into smaller droplets.

Further, as previously noted, the EHD system 104 may include the charging system 210 that is operatively coupled to the proximal end of the inlet 208. Alternatively, the charging system 210 may be a standalone module disposed relatively opposite the inlet 208. Additionally, the EHD system 104 may include the charge collector 212 disposed distal of the inlet 208 and the charging system 210 such that a face of the charge collector 212 is substantially aligned with the charging system 210. Moreover, it may be desirable to mount the charging system 210 between the inlet 208 and the charge collector 212 so that the droplets 216 injected by the inlet 208 may be directed past the charging system 210 towards the charge collector 212.

With continuing reference to FIG. 2, the charging system 210 may be coupled to a high voltage power supply (not shown) to create a charge potential in the charging system 210 and generate an electric field around the charging system 210. When the droplets 216 pass through the electric field, they may be ionized into positively and negatively charged droplets. For example, if the electric field has a negative potential, the droplets 216 may be ionized into positively charged and negative charged droplets. Moreover, the charge may be proportional to the electrostatic charge of the charging system 210, the size of the droplet 216, strength of the electric field, and so on. Furthermore, the droplets with a charge substantially similar to the charge of the charging system 210 (negatively charged droplets) may be repelled by the charging system 210 and therefore, these droplets may deposit their charge at the inlet 208. Additionally, the droplets with a charge substantially opposite to the charge of the charging system 210 (positively charged droplets) may be attracted by the charging system 210 because of an electrostatic force between the charging system and the droplets 216. Consequently, these droplets may move towards the charging system 210. A drag force having a magnitude greater than that of the electrostatic force may be introduced in a direction opposite to the electrostatic force to carry the droplets 216 away from the charging system 210. However, by drawing the droplets 216 away from the charging system 210, the electrostatic potential of the EHD system 104 is increased. Therefore, a drag force that is substantially higher than the electrostatic force is desirable. To this end, one or more pressure differential valves, such as the pressure differential valve 114 may be disposed in the inlet 208 of the EHD system 104 or between the steam turbine 102 and the EHD system 104, in one example. The pressure differential valves 114 may increase the velocity and, therefore, the drag force of the exhaust steam 215 entering the EHD system 104.

In some embodiments, the charging system 210 may be an electrostatic ring, rod, or a plate. Alternatively, the charging system 210 may be plasma or an electron beam. Further, as previously noted, the charging system 210 may be disposed at a location substantially opposite the inlet 208. In the presently illustrated embodiment of FIG. 2, the charging system 210 is configured as an electrostatic ring disposed around the inlet 208. It will be appreciated that in other embodiments the ring may be replaced by a plate, rod, or plasma without departing from the scope of the present disclosure.

The charge collector 212 may be a charge collection grid or mesh coupled to an electrical circuit. Alternatively, the charge collector 212 may simply be a connection to ground. Considerable flexibility is afforded in the size and shape of the charge collector 212. For example, the charge collector 212 may be shaped as a rectangular grid placed substantially normal to a longitudinal axis of the EHD system 104. Positioning the charge collector 212 as described hereinabove enhances charge collection from the droplets 216. In other examples, the charge collector 212 may be shaped as a concave or convex mesh without departing from the scope of the present disclosure.

Moreover, in certain embodiments, the EHD system 104 may further include a guiding structure 218 disposed between and/or surrounding the charging system 210 and the charge collector 212. The guiding structure 218 may be configured to provide a controlled path for movement of the droplets 216 from the charging system 210 to the charge collector 212. In addition, in one embodiment, the guiding structure 218 may be a substantially hollow tube having a proximal end and a distal end. For purposes of this disclosure, the distal end refers to an end of the guiding structure 218 that is adjacent to the charging system 210 and the proximal end refers to an end of the guiding structure 218 that is adjacent to the charge collector 212. Furthermore, the guiding structure 218 may be sized to allow large amounts of exhaust steam 215 to pass through the EHD system 104.

The guiding structure 218 may have a substantially circular, elliptical, rectangular, polygonal, or randomly shaped cross-section without departing from the scope of the present disclosure. In other embodiments, to increase velocity of the exhaust steam 215, the guiding structure 218 may have a conical or tapered shape. It will be understood that the shape and size of the guiding structure 218 may vary considerably from application to application and therefore embodiments of the present disclosure do not limit the scope of the size and shape of the guiding structure 218. Further, the guiding structure 218 may be formed using a graded plastic, metal, or polymer material. Materials may include steel, carbon fiber, PVC, aluminum, Teflon™ (polytetrafluoroethylene), plastics, nylon, or glass (metals, organic and inorganic materials), for example.

Further, one or more components of the EHD system 104, such as the inlet 208 and/or the guiding structure 218 may be coated with a suitable material to prevent corrosion and/or to prevent the droplets 216 from sticking to the surface of these components. For example, an anti-rust and/or non-stick coating may be applied to the inner surface of the guiding structure 218. In some embodiments, the temperature of the exhaust steam 215 may be very high (for example, in the range of a few hundred degrees Fahrenheit). In such cases, the components of the EHD system 104 may be formed from materials that can withstand high temperatures. Metals, glass, or alloys may be used, for instance.

In addition to the components described hereinabove, various other systems, modules, or devices may be connected to or be part of the EHD system 104 contributing to the functionality of the EHD system 104. For example, a power supply (not shown) may be coupled to the charging system 210 where the power supply may be configured to provide the charging system 210 the desired electrostatic potential to electrostatically charge the droplets 216. Further, the EHD system 104 may also include electrical connections between the various components to complete a charging circuit. For example, in case the charge collector 212 accumulates charge, a load 220 may be coupled between the inlet 208 and the charge collector 212 to produce working current. The EHD system 104 may further include one or more humidity sensors (not shown) configured to monitor the operating conditions, pressure sensors configured to monitor pressure of the steam entering the EHD system 104, and the like.

During operation, the charging system 210 is configured to generate an electrostatic field in its vicinity. The droplets 216 may be injected into this electrostatic field and the charging system 210 may be configured to ionize the droplets 216 into positively and negatively charged droplets. To describe the operation of the charging system, it will be assumed that the charging system 210 is charged to a negative potential. It will be understood, however, that this assumption is merely exemplary and the charging system 210 may just as easily be charged to a positive potential. The negatively charged droplets may be repelled by the charging system 210, and therefore, these droplets may deposit their charge at the inlet 208. On the other hand, an attraction force may be set up between the charging system 210 and the positively charged droplets 216. As the negatively charged droplets deposit their charge at the inlet 208, an attraction force may be set up between the inlet 208 and the oppositely charged droplets 216 as well. The attraction force may draw the positively charged droplets 216 towards the charging system 210 or the inlet 208. However, the drag force of the exhaust steam 215 draws the positively charged droplets 216 against the force of the electrostatic field and towards the charge collector 212, where the positive charge is accumulated.

Such movement of the positively charged droplets 216 against the negative electrostatic field entails electrical work. This electrical work may be converted into an increase in the strength of the electric field. As the exhaust steam 215 continuously drives the positively charged droplets 216 against the electrostatic field, the voltage between the charging system 210 (or the inlet 208) and the charge collector 212 continues to increase. In some cases, to allow current flow, the charge collector 212 and the inlet 208 may be operatively coupled. It will be understood that in case the charging system 210 is positively charged, the positively charged droplets will deposit their charge at the inlet 208 and the negatively charged droplets will be driven towards the charge collector 212.

Figure 3:
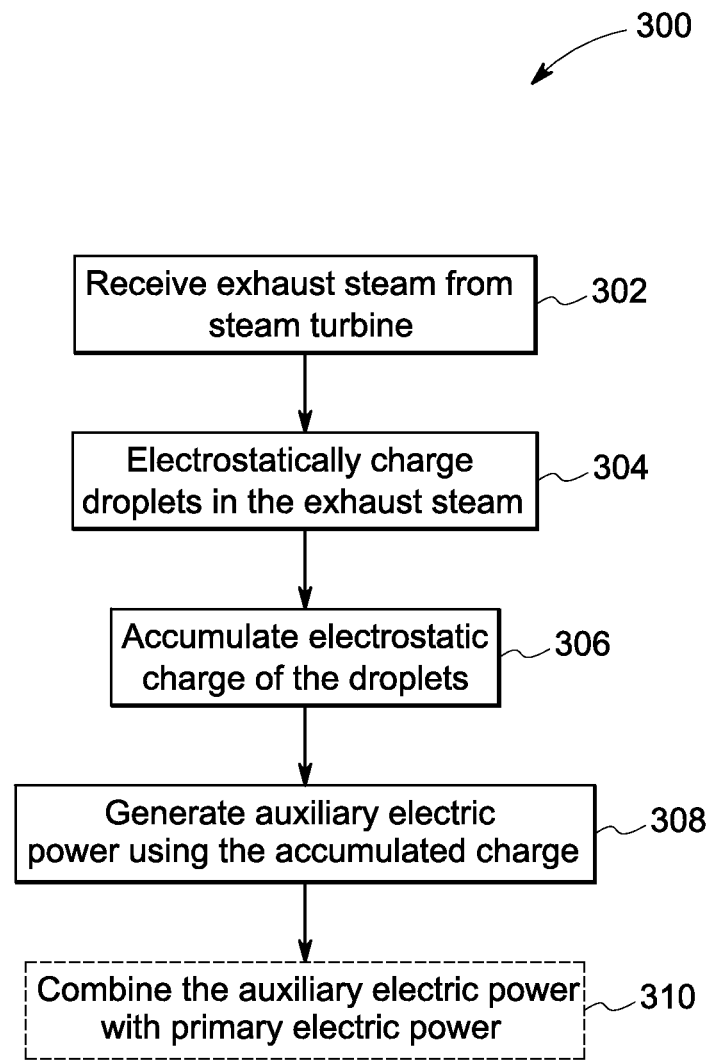
FIG. 3 is a flowchart illustrating an exemplary method for generating electric power in a power plant, according to aspects of the present disclosure.

FIG. 3 is a flowchart 300 illustrating an exemplary method for generating electric power in a power plant. The power plant may include a steam turbine and an EHD system. The method may include the steps of receiving exhaust steam from a steam turbine, electrostatically charging droplets present in the exhaust steam, and collecting the charge at a charge collector. Furthermore, the method may include the step of generating electric power using the accumulated charge. The method 300 is described with reference to the elements of FIGS. 1 and 2.

The method 300 begins at step 302 where at least a portion of exhaust steam is received from a steam turbine. In one embodiment, the steam turbine 102 may convert latent energy of the steam 214 into electric power and expend exhaust steam 215 from the outlet 112. It will be appreciated that the outlet 112 may be positioned anywhere along the steam turbine 102. For example, the outlet 112 may be positioned at the end of all the interspersed nozzle and blade stages. Alternatively, the outlet 112 may be placed in between one or two intermediate stages of the steam turbine 102. Further, partial exhaust steam may be tapped from any stage of the steam turbine 102 without departing from the scope of the present disclosure.

An evaporator and a compressor, such as the evaporator 202 and the compressor 204 may be utilized to convert a liquid, such as water into steam 214. The evaporator 202 heats the liquid to its boiling temperature to generate the steam 214. In one instance, the steam 214 from the evaporator 202 may be directly supplied to the steam turbine 102. Alternatively, the pressure and temperature of the steam 214 may be further increased in the compressor 204 and/or a superheater before the steam is supplied to the steam turbine 102.

As the steam 214 is conveyed from an inlet of the steam turbine 102 and through the various stages of rotatable blades 108 in the steam turbine 102, the steam loses some energy, pressure, and/or temperature. Consequently, a portion of the steam 214 may be condensed into small droplets. These droplets are carried along with the exhaust steam 215 due to the velocity of the exhaust steam 215.

Subsequently, the droplets 216 present in the exhaust steam 215 may be electrostatically charged as depicted by step 304. To this end, the outlet 112 of the steam turbine 102 is coupled to the inlet 208 of the EHD system 104. In one embodiment, the pressure differential valves 114 may be employed to reduce the cross-section of the outlet pipe/vent between the outlet 112 and the inlet 208, thereby increasing the velocity of the exhaust steam 215. Further, the charging system 210 may be coupled to the inlet 208. In other embodiments, the charging system 210 may be a part of the inlet 208 or be positioned substantially opposite the inlet 208. The high velocity exhaust steam 215 enters the EHD system 104 through the inlet 208. As described previously, the inlet 208 may be configured to further increase the velocity of the exhaust steam 215 entering the EHD system 104. When the droplets 216 are injected or just prior to being injected by the inlet 208, the charging system 210 may be configured to ionize the droplets into negatively and positively charged droplets.

At step 306, the charge of the droplets 216 may be accumulated at the charge collector 212. As described previously, the droplets 216 that have a charge similar to the charge of the charging system 210 deposit their charge at the inlet 208. In addition, the droplets 216 that have a charge opposite to the charge of the charging system 210 are drawn towards the charge collector 212 because of a net force between the drag force of the exhaust steam 215 and the electrostatic force created by the charging system 210. If the drag force is greater than the electrostatic force, the charged droplets 216 are drawn towards the charge collector 212 and their charge is deposited at the charge collector 212. The charge from the droplets 216 is accumulated at the charge collector 212 until the drag force remains greater than the continuously increasing electrostatic force. To maintain a high drag force, the pressure differential valves 114 may be configured such that they vary the constraints placed on the outlet pipe/vent or the inlet 208, thereby varying the velocity of the exhaust steam 215 entering the EHD system 104. Moreover, the cross-section of the inlet 208 may be variable, gradually reducing in size, such that the velocity of the exhaust steam 215 entering the EHD system 104 is progressively increased.

As the exhaust steam 215 along with the droplets 216 is conveyed to the charge collector 212, the charge of the droplets 216 may be deposited at the charge collector 212 and the spent steam 217 and the droplets 216 may be collected or guided towards an outlet of the EHD system 104. The outlet may be configured to release the spent steam 217 into the environment. Alternatively, the outlet of the EHD system 104 may be coupled to the condenser 206, such that the spent steam 217 along with the droplets 216 may be directed to the condenser 206, where the spent steam 217 may be condensed and converted back into a liquid. In another embodiment, the condenser 206 may be an integral part of the EHD system 104. In such a case, the condenser 206 may convert the steam and droplets into a liquid. To this end, the condenser 206 may be directly coupled to the charge collector 212, and a cooling plate or tube of the condenser 206 may be positioned adjacent to the charge collector 212 to convert the droplets and steam into liquid once the charge of the droplets 216 in deposited at the charge collector 212. This liquid may be conveyed out of the EHD system 104 via the outlet.

Subsequently, at step 308, auxiliary electric power may be generated using the charge accumulated at the charge collector 212. In one embodiment, a load, such as load 220, may be coupled between the inlet 208 and the charge collector 212 to allow an electric current to flow.

Further, as previously described, the generator 111 that is coupled to the shaft 110 of the steam turbine 102 may be configured to generate electric power. The power generated by the generator 111 may generally be referred to as primary electric power. In one embodiment, the auxiliary electric power generated by the EHD system 104 may be combined with the primary electric power generated by the generator 111, as depicted by step 310. The combined electric power may be provided to a power grid. In other embodiments, the auxiliary electric power generated by the EHD system 104 may be utilized by the power plant 100 to run some of the auxiliary components or modules of the power plant 100.

It will be understood that the primary electric power is alternating current (AC), while the auxiliary electric power generated is direct current (DC). Further, the auxiliary electric power may be high voltage (approximately in the range of hundreds of kilovolts) and low current, while the primary electric power may be low voltage (in the range of a few hundred volts) and high current. To combine these different forms of electric power, the output of the EHD system 104 may be coupled to an inverter to convert the DC power into AC. Moreover, a step down transformer may be coupled to an output of the inverter to reduce the voltage generated by the EHD system 104 so that the voltage of the auxiliary electric power is comparable to the voltage of the primary electric power. It will be understood that this conversion method is only one of the possible methods to combine the primary and auxiliary electric power. In other embodiments, various other modules may be used instead to achieve the same result without departing from the scope of the present disclosure.

In one embodiment, the EHD system 104 may be selectively employed to generate the auxiliary electric power. For example, if the primary electric power generated by the generator 111 is below a threshold level, the EHD system 104 may be powered on to generate the auxiliary electric power. Alternatively, the EHD system 104 may be powered on to generate the auxiliary electric power whenever there arises a need for power to drive an auxiliary component, such as, but not limited to, humidity sensors or evaporators of the power plant 100. A control system (not shown) may be employed to monitor the primary electric power or the auxiliary components continuously or periodically. For example, if the generation of the primary electric power falls below a determined threshold value, the controller may be configured to provide a signal to energize the EHD system 104. Similarly, if there exists a need to drive an auxiliary component, the controller may be configured to provide a signal to energize the EHD system 104. In some instances, when the EHD system 104 is not employed, the exhaust steam from the steam turbine 102 may be directly provided to the condenser 206 or released to the environment.

The various embodiments of the exemplary power plant including the steam turbine 102 and the EHD system 104 described hereinabove increase the efficiency of the power plant by utilizing the exhaust steam from the steam turbine to generate additional electric power. Depending on the selected application, the efficiency of the power plant may be greater than the efficiency of a conventional steam turbine by about 10%. In times where operating costs are on the rise due to increasing costs of materials and/or fuel, such an increase in efficiency may help reduce overall operating costs and/or increase the electric power generated per dollar. Moreover, the EHD system may be retrofit as a kit to an output of currently existing steam turbines or between conventional steam turbines and condensers, at minimal cost. Further, as the exhaust steam of the steam turbine is utilized, use of a droplet generator is circumvented, thus increasing the efficiency of the EHD system as well and reducing the overall cost of the power plant.

Furthermore, the skilled artisan will recognize the interchangeability of various features from different embodiments. Similarly, the various method steps and features described, as well as other known equivalents for each such methods and feature, can be mixed and matched by one of ordinary skill in this art to construct additional assemblies and techniques in accordance with principles of this disclosure.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A power plant, comprising:
 a steam turbine configured to release exhaust steam;
 an electro-hydrodynamic system operatively coupled to the steam turbine and configured to:
  receive at least a portion of the exhaust steam from the steam turbine;
  deposit an electrostatic charge on a plurality of droplets in the exhaust steam; and
  generate auxiliary electric power using the plurality of electrostatically charged droplets in the exhaust steam.

2. The power plant of claim 1, wherein the steam turbine comprises an outlet configured to transfer at least a portion of the exhaust steam from the steam turbine to the electro-hydrodynamic system.

3. The power plant of claim 1, wherein the electro-hydrodynamic system comprises:
 an inlet configured to introduce at least a portion of the exhaust steam from the steam turbine to the electro-hydrodynamic system;
 a charging system configured to deposit the electrostatic charge on the plurality of droplets in the exhaust steam; and
 a charge collector configured to collect the electrostatic charge from the plurality of droplets.

4. The power plant of claim 3, wherein the electro-hydrodynamic system further comprises a substantially hollow guiding structure operatively coupled between the charging system and the charge collector to guide the plurality of droplets from the charging system to the charge collector.

5. The power plant of claim 1, further comprising one or more pressure differential valves operatively coupled between the steam turbine and the electro-hydrodynamic system and configured to increase a velocity of the exhaust steam.

6. The power plant of claim 1, further comprising a condenser operatively coupled to an output of the electro-hydrodynamic system and configured to:
 receive spent steam from the electro-hydrodynamic system; and
 condense the spent steam into a liquid.

7. The power plant of claim 6, further comprising:
 an evaporator configured to heat the liquid into steam; and
 a compressor operatively coupled between the evaporator and the steam turbine and configured to increase a temperature and a pressure of the steam received from the evaporator.

8. The power plant of claim 1, wherein the electro-hydrodynamic system comprises a condenser configured to condense spent steam into a liquid.

9. A power plant, comprising:
- a steam turbine configured to release exhaust steam from an outlet;
- an electro-hydrodynamic system operatively coupled to the outlet of the steam turbine, the electro-hydrodynamic system comprising:
  - a charging system configured to deposit an electrostatic charge on a plurality of droplets in at least a portion of the exhaust steam; and
  - a charge collector configured to collect the electrostatic charge from the plurality of droplets and generate auxiliary electric power using the collected electrostatic charge.

10. The power plant of claim 9, wherein the electro-hydrodynamic system further comprises:
- an inlet coupled to the outlet of the steam turbine and configured to introduce the exhaust steam into the electro-hydrodynamic system; and
- a guiding structure coupled between the charging system and the charge collector and configured to guide the plurality of droplets from the charging system to the charge collector.

11. The power plant of claim 10, wherein the inlet comprises a proximal end and a distal end, wherein the distal end is coupled to the outlet of the steam turbine, and wherein a cross-section of the proximal end is smaller than a cross-section of the distal end.

12. The power plant of claim 9, further comprising one or more pressure differential valves operatively coupled between the steam turbine and the electro-hydrodynamic system and configured to increase a velocity of the exhaust steam.

13. The power plant of claim 9, further comprising a condenser coupled to the charge collector and configured to:
- receive spent steam from the electro-hydrodynamic system; and
- convert the spent steam into a liquid.

14. The power plant of claim 13, further comprising:
- an evaporator for converting the liquid into steam; and
- a compressor for increasing a temperature and a pressure of the steam to a determined level.

15. The power plant of claim 9, wherein the electro-hydrodynamic system further comprises a condenser configured to condense spent steam into a liquid.

16. The power plant of claim 9, further comprising a generator coupled to the steam turbine and configured to generate primary electric power.

17. A method for generating electric power in a power plant, the method comprising:
- receiving at least a portion of exhaust steam from a steam turbine;
- electrostatically charging a plurality of droplets in the exhaust steam using a charging system;
- accumulating an electrostatic charge from the plurality of electrostatically charged droplets using a charge collector; and
- generating auxiliary electric power using the accumulated electrostatic charge.

18. The method of claim 17, further comprising:
- driving a generator operatively coupled to the steam turbine to generate primary electric power; and
- combining the primary electric power with the auxiliary electric power.

19. The method of claim 17, further comprising drawing the electrostatically charged droplets towards the charge collector against an electric field.

* * * * *